(12) United States Patent
Yang et al.

(10) Patent No.: US 11,349,756 B2
(45) Date of Patent: *May 31, 2022

(54) APPARATUS AND METHOD FOR TRANSMITTING AND RECEIVING SIGNAL IN MULTIMEDIA SYSTEM

(71) Applicant: Samsung Electronics Co., Ltd., Suwon-si (KR)

(72) Inventors: Hyun-Koo Yang, Seoul (KR); Sung-Hee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 50 days.

This patent is subject to a terminal disclaimer.

(21) Appl. No.: 16/927,136

(22) Filed: Jul. 13, 2020

(65) Prior Publication Data

US 2020/0344165 A1 Oct. 29, 2020

Related U.S. Application Data

(63) Continuation of application No. 16/428,041, filed on May 31, 2019, now Pat. No. 10,715,434, which is a (Continued)

(30) Foreign Application Priority Data

Jul. 1, 2015 (KR) .................. 10-2015-0094400

(51) Int. Cl.
*H04L 45/74* (2022.01)
*H04L 45/00* (2022.01)
(Continued)

(52) U.S. Cl.
CPC .............. *H04L 45/74* (2013.01); *H04L 45/66* (2013.01); *H04L 65/4076* (2013.01);
(Continued)

(58) Field of Classification Search
CPC ....... H04L 45/74; H04L 45/66; H04L 69/321; H04L 69/22; H04L 69/324;
(Continued)

(56) References Cited

U.S. PATENT DOCUMENTS 7,751,399 B2   7/2010  Martini et al.
10,313,237 B2* 6/2019  Yang .................... H04L 69/22
(Continued)

FOREIGN PATENT DOCUMENTS

CN   101686180 A   3/2010
CN   102239722 A   11/2011
(Continued)

OTHER PUBLICATIONS

Chinese Office Action dated Feb. 27, 2020, issued in a counterpart Chinese Application No. 201680037621.4.

*Primary Examiner* — Brenda H Pham
(74) *Attorney, Agent, or Firm* — Jefferson IP Law, LLP

(57) ABSTRACT

A method of operating a transmitting apparatus in a multimedia system is provided. The method includes inputting at least one network layer packet, generating a link layer packet based on the at least one network layer packet, and transmitting the link layer packet, wherein the link layer packet includes a header including information indicating whether the link layer packet includes a single network layer packet and information indicating an identifier related to the at least one network layer packet.

10 Claims, 9 Drawing Sheets

Related U.S. Application Data continuation of application No. 15/200,569, filed on Jul. 1, 2016, now Pat. No. 10,313,237.

(51) Int. Cl.
*H04L 69/321* (2022.01)
*H04L 69/22* (2022.01)
*H04L 69/324* (2022.01)
*H04L 65/611* (2022.01)
*H04L 65/65* (2022.01)
*H04L 69/164* (2022.01)
*H04L 69/325* (2022.01)
*H04L 69/326* (2022.01)

(52) U.S. Cl.
CPC ............ *H04L 65/608* (2013.01); *H04L 69/22* (2013.01); *H04L 69/321* (2013.01); *H04L 69/324* (2013.01); *H04L 69/164* (2013.01); *H04L 69/325* (2013.01); *H04L 69/326* (2013.01)

(58) Field of Classification Search
CPC . H04L 65/4076; H04L 65/608; H04L 65/164; H04L 69/325; H04L 69/326
See application file for complete search history.

(56) References Cited

U.S. PATENT DOCUMENTS

| | | | |
|---|---|---|---|
| 10,715,434 | B2 * | 7/2020 | Yang ................... H04L 65/4076 |
| 2003/0031202 | A1 | 2/2003 | Teng |
| 2004/0193733 | A1 | 9/2004 | Vangal et al. |
| 2008/0151891 | A1 | 6/2008 | Juszkiewicz et al. |
| 2011/0170545 | A1 | 7/2011 | Zheng et al. |
| 2011/0255558 | A1 | 10/2011 | Hwang et al. |
| 2014/0010154 | A1 | 1/2014 | Hong et al. |
| 2015/0089560 | A1 | 3/2015 | Park et al. |
| 2016/0165017 | A1 | 6/2016 | Kwon et al. |
| 2016/0198023 | A1 | 7/2016 | Kwon et al. |

FOREIGN PATENT DOCUMENTS

| | | |
|---|---|---|
| CN | 102413049 A | 4/2012 |
| KR | 10-2011-0117033 A | 10/2011 |
| KR | 10-2013-0120422 A | 11/2013 |
| WO | 2014/171806 A1 | 10/2014 |
| WO | 2015/064942 A1 | 5/2015 |

* cited by examiner

APPARATUS AND METHOD FOR TRANSMITTING AND RECEIVING SIGNAL IN MULTIMEDIA SYSTEM

CROSS-REFERENCE TO RELATED APPLICATION(S)

This application is a continuation application of prior application Ser. No. 16/428,041, filed on May 31, 2019, which will be issued as U.S. Pat. No. 10,715,434 on Jul. 14, 2020, which is a continuation application of prior application Ser. No. 15/200,569, filed on Jul. 1, 2016, which has issued as U.S. Pat. No. 10,313,237 on Jun. 4, 2019 and was based on and claimed priority under 35 U.S.C § 119(a) of a Korean patent application number 10-2015-0094400, filed on Jul. 1, 2015, in the Korean Intellectual Property Office, the disclosure of which is incorporated by reference herein in its entirety.

TECHNICAL FIELD

The present disclosure relates to an apparatus and method for transmitting and receiving a signal in a multimedia system. More particularly, the present disclosure relates to an apparatus and method for transmitting and receiving a signal in a multimedia system supporting a link layer protocol.

BACKGROUND

Recently, various devices for broadcast services have been provided, so there is a need for a method of supporting various receiving schemes in the broadcast services.

Further, demand for data transport for various formats including a packet which is based on an internet protocol (IP) as well as moving picture experts group-2 (MPEG 2)-transport stream (TS) packet transport.

Generally, a layer which is between a physical layer and an IP layer in a communication system is referred to as link layer, and a design for the link layer is optimized according to a type of a service provided by the communication system and a characteristic of the physical layer.

So, there is a need for a scheme of optimizing a link layer protocol for a broadcast system by considering a characteristic of a physical layer of a broadcast network and a broadcast service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for transmitting and receiving a signal in a multimedia system.

Another aspect of the present disclosure is to provide an apparatus and method for transmitting and receiving a signal in a multimedia system supporting a link layer protocol.

Another aspect of the present disclosure is to provide an apparatus and method for transmitting and receiving information related to a sub-stream included in a link layer packet in a multimedia system supporting a link layer protocol.

Another aspect of the present disclosure is to provide an apparatus and method for transmitting and receiving information related to a link layer packet carrying a plurality of sub-streams in a multimedia system supporting a link layer protocol.

Another aspect of the present disclosure is to provide an apparatus and method for effectively transmitting and receiving various types of services in a multimedia system supporting a link layer protocol.

Another aspect of the present disclosure is to provide an apparatus and method for filtering a sub-stream in a link layer packet in a multimedia system supporting a link layer protocol.

In accordance with an aspect of the present disclosure, a method of operating a transmitting apparatus in a multimedia system is provided. The method includes inputting at least one network layer packet, generating a link layer packet based on the at least one network layer packet, and transmitting the link layer packet, wherein the link layer packet includes a header including information indicating whether the link layer packet includes a single network layer packet and information indicating an identifier related to the at least one network layer packet.

In accordance with another aspect of the present disclosure, a method of operating a transmitting apparatus in a multimedia system is provided. The method includes generating a link layer packet including a header including information related to a first session among a plurality of sessions if the plurality of sessions is included in a physical layer channel signal, and transmitting the link layer packet.

In accordance with another aspect of the present disclosure, a method of operating a receiving apparatus in a multimedia system is provided. The method includes receiving a link layer packet, wherein the link layer packet is generated based on at least one network layer packet, and wherein the link layer packet includes a header including information indicating whether the link layer packet includes a single network layer packet and information indicating an identifier related to the at least one network layer packet.

In accordance with another aspect of the present disclosure, a method of operating a receiving apparatus in a multimedia system is provided. The method includes receiving a link layer packet, wherein the link layer packet includes a header including information related to a first session among a plurality of sessions if the plurality of sessions is included in a physical layer channel signal.

In accordance with another aspect of the present disclosure, a transmitting apparatus in a multimedia system is provided. The transmitting apparatus includes a processor configured to input at least one network layer packet, generate a link layer packet based on the at least one network layer packet, and transmit the link layer packet, wherein the link layer packet includes a header including information indicating whether the link layer packet includes a single network layer packet and information indicating an identifier related to the at least one network layer packet.

In accordance with another aspect of the present disclosure, a transmitting apparatus in a multimedia system is provided. The transmitting apparatus includes a processor configured to generate a link layer packet including a header including information related to a first session among a plurality of sessions if the plurality of sessions is included in a physical layer channel signal, and transmit the link layer packet.

In accordance with another aspect of the present disclosure, a receiving apparatus in a multimedia system is provided. The receiving apparatus includes a processor configured to receive a link layer packet, wherein the link layer packet is generated based on at least one network layer packet, and wherein the link layer packet includes a header including information indicating whether the link layer packet includes a single network layer packet and information indicating an identifier related to the at least one network layer packet.

In accordance with another aspect of the present disclosure, a receiving apparatus in a multimedia system is provided. The receiving apparatus includes a processor configured to receive a link layer packet, wherein the link layer packet includes a header including information related to a first session among a plurality of sessions if the plurality of sessions is included in a physical layer channel signal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
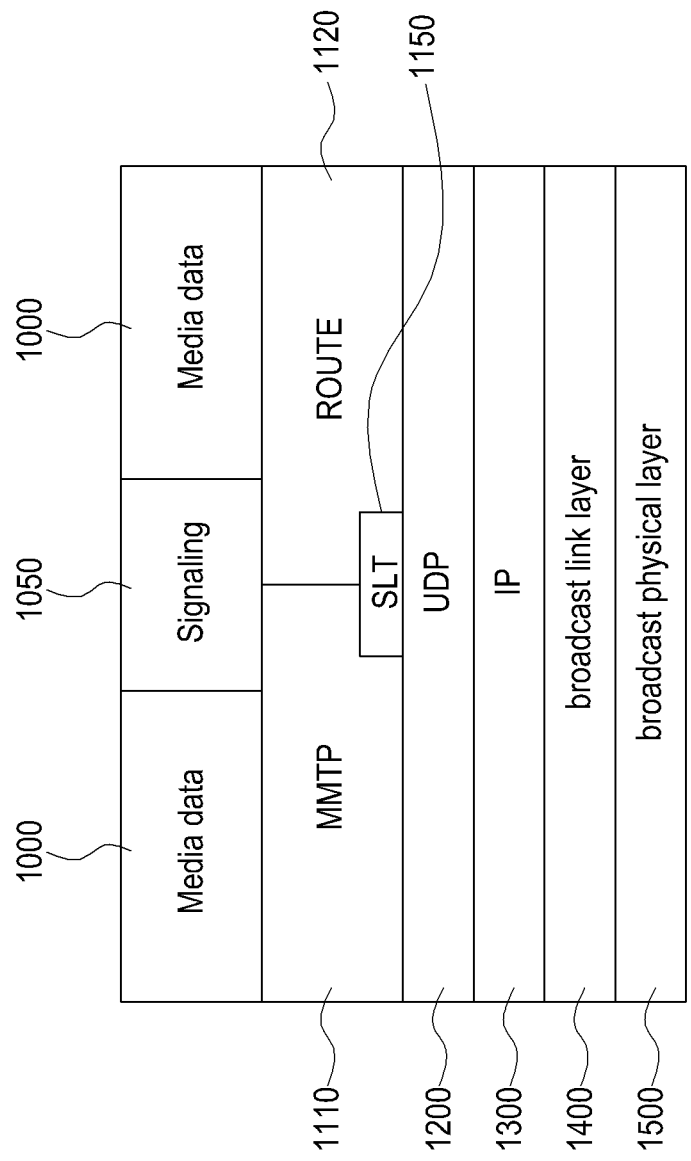
FIG. 1 schematically illustrates a system architecture of a multimedia system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a moving picture experts group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic accessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, for example, a terminal may be an electronic device.

According to various embodiments of the present disclosure, a transmitting apparatus may be a service provider or a terminal.

According to various embodiments of the present disclosure, a receiving apparatus may be a terminal or a service provider.

According to various embodiments of the present disclosure, a transmitting and receiving apparatus may be a terminal or a service provider.

In various embodiments of the present disclosure, it will be noted that the term terminal may be interchangeable with the term mobile station (MS), wireless terminal, mobile device, user equipment (UE), and/or the like.

An embodiment of the present disclosure proposes an apparatus and method for transmitting and receiving a signal in a multimedia system.

An embodiment of the present disclosure proposes an apparatus and method for transmitting and receiving a signal in a multimedia system supporting a link layer protocol.

An embodiment of the present disclosure proposes an apparatus and method for transmitting and receiving information related to a sub-stream included in a link layer packet in a multimedia system supporting a link layer protocol.

An embodiment of the present disclosure proposes an apparatus and method for transmitting and receiving information related to a link layer packet carrying a plurality of sub-streams in a multimedia system supporting a link layer protocol.

An embodiment of the present disclosure proposes an apparatus and method for effectively transmitting and receiving various types of services in a multimedia system supporting a link layer protocol.

An embodiment of the present disclosure proposes an apparatus and method for filtering a sub-stream in a link layer packet in a multimedia system supporting a link layer protocol.

An apparatus and method proposed in an embodiment of the present disclosure may be applied to various communication systems such as a digital video broadcasting system such as a mobile broadcasting service such as a digital multimedia broadcasting (DMB) service, a digital video broadcasting-handheld (DVP-H) service, an advanced television systems committee-mobile/handheld (ATSC-M/H) service, and the like, and an internet protocol television (IPTV) service, an MPEG media transport (MMT) system, an evolved packet system (EPS), a long term evolution (LTE) mobile communication system, an LTE-advanced (LTE-A) mobile communication system, a high speed downlink packet access (HSDPA) mobile communication system, a high speed uplink packet access (HSUPA) mobile communication system, a high rate packet data (HRPD) mobile communication system proposed in a 3rd generation partnership project 2 (3GPP2), a wideband code division multiple access (WCDMA) mobile communication system proposed in the 3GPP2, a CDMA mobile communication system proposed in the 3GPP2, an institute of electrical and electronics engineers (IEEE) mobile communication system, a mobile IP system, and/or the like.

An apparatus and method proposed in an embodiment of the present disclosure may be applied to an ATSC system which is based on an MMT scheme.

For convenience, in various embodiments of the present disclosure, it will be assumed that a multimedia system is based on an MMT scheme.

A system architecture of a multimedia system according to an embodiment of the present disclosure will be described with reference to FIG. 1.

FIG. 1 schematically illustrates a system architecture of a multimedia system according to an embodiment of the present disclosure.

Referring to FIG. 1, a service includes media data 1000 and a signaling 1050 for transmitting information required for a receiving apparatus to acquire and consume the media data 1000. For example, the receiving apparatus may be a terminal. The media data 1000 may be encapsulated into a format suitable for transport. For example, an encapsulation scheme for the media data 1000 may follow a media processing unit (MPU) format defined in an international organization for standardization (ISO)/international electronical committee (IEC) 23008-1 MMT protocol or a dynamic adaptive streaming over hyper text transfer protocol (DASH) segment format defined in an ISO/IEC 23009-1 DASH.

The media data 1000 and the signaling 1050 are packetized by an application layer protocol.

A case that an MMT protocol (MMTP) 1110 defined in an MMT scheme and a real-time object delivery over unidirectional transport (ROUTE) protocol 1120 are used as the application layer protocol is illustrated in FIG. 1. At this time, in order for a receiving apparatus to know that a service is transported based on which application layer protocol, a method for informing information on an application layer protocol that the service is transported is required, independently from the application layer protocol.

A service list table (SLT) 1150 illustrated in FIG. 1 is a signaling scheme used for informing information on an application layer protocol that a service is transported, configures information on a service as a table format, and packetizes the table. An SLT will be described below, so a detailed description thereof will be omitted herein.

A signaling including the packetized media data and the SLT 1150 is output to a broadcast link layer 1400 after passing a user datagram protocol (UDP) 1200 and an IP 1300. An example of a broadcast link layer may be an ATSC link-layer protocol (ALP) defined in ATSC 3.0. The ALP generates an ALP packet based on an input IP packet to output the ALP packet to a broadcast physical layer 1500.

It will be noted that the broadcast link layer 1400 may use an MPEG2-TS packet or packetized data which has a general format as well as the IP packet including the media data or the signaling as input. At this time, signaling information required for controlling the broadcast link layer 1400 is output to the broadcast physical layer 1500. Here, a format of the signaling information is an ALP packet.

The broadcast physical layer 1500 generates a physical layer frame based on an input ALP packet, converts the physical layer frame into a radio signal, and transmits the radio signal. The broadcast physical layer 1500 has at least one signal processing path. An example of the signal processing path may be a physical layer pipe (PLP) defined in a digital video broadcasting-terrestrial version 2 (DVB-T2) or ATSC 3.0, and all of one or more services or a part of a service may be mapped to the PLP. Here, all of the one or more services or the part of the service mapped to the PLP will be referred to as sub-stream.

A system architecture of a multimedia system according to an embodiment of the present disclosure has been described with reference to FIG. 1, and an architecture of a broadcast link layer of a multimedia system according to an embodiment of the present disclosure will be described with reference to FIG. 2.

Figure 2:
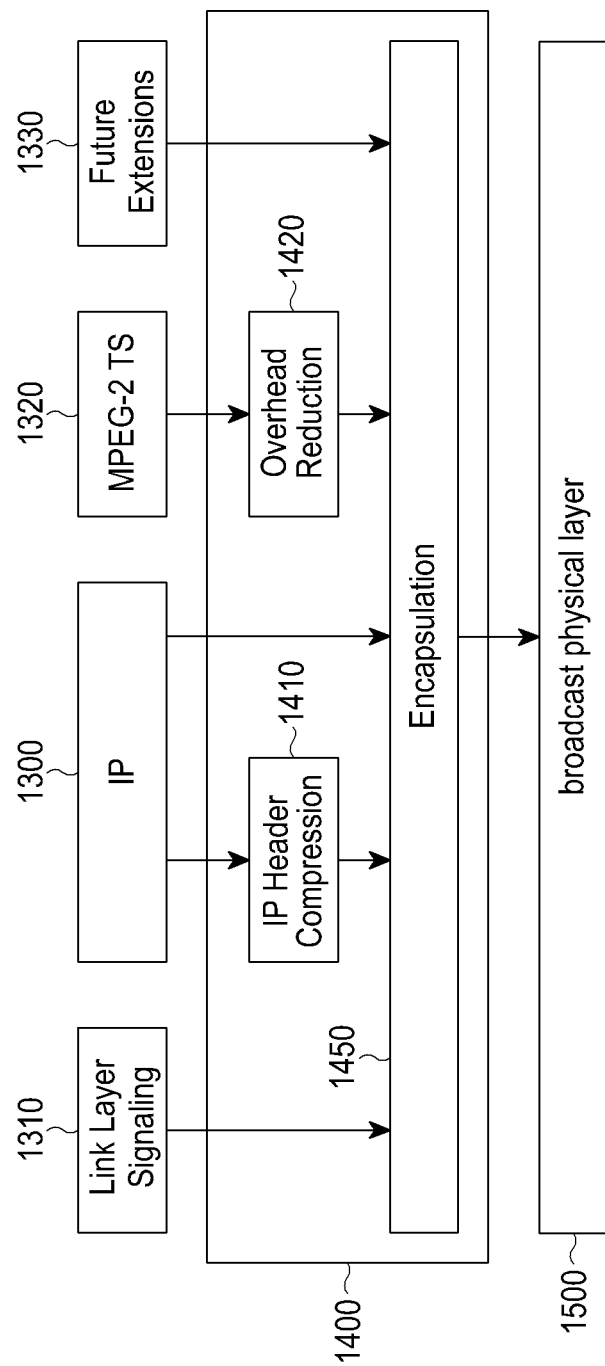
FIG. 2 schematically illustrates an architecture of a broadcast link layer of a multimedia system according to an embodiment of the present disclosure.

FIG. 2 schematically illustrates an architecture of a broadcast link layer of a multimedia system according to an embodiment of the present disclosure.

Referring to FIG. 2, input data of a broadcast link layer 1400 includes an IP packet 1300, and may further include a link layer signaling 1310, an MPEG2-TS packet 1320, and a future extension 1330. The future extension 1330 indicates other packet types which may be input at the broadcast link layer 1400, e.g., an ALP layer, and protocols. The input data may pass an additional processing process according to a type of the input data before an encapsulation process 1450. For example, if the input data is the IP packet 1300, the additional processing process may be an IP header compression process 1410. If the input data is the MPEG2-TS packet 1320, the additional processing process may be an overhead reduction process 1420.

In the encapsulation process 1450, the input data may pass a segment process or a concatenation process.

An architecture of a broadcast link layer of a multimedia system according to an embodiment of the present disclosure has been described with reference to FIG. 2, and a format of an ALP packet in a multimedia system according to an embodiment of the present disclosure will be described with reference to FIG. 3.

Figure 3:
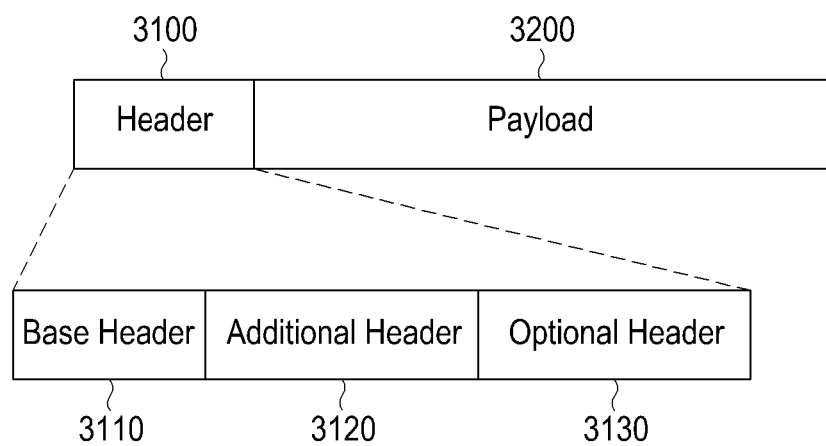
FIG. 3 schematically illustrates a format of an advanced television systems committee (ATSC) link-layer protocol (ALP) packet in a multimedia system according to an embodiment of the present disclosure.

FIG. 3 schematically illustrates a format of an ALP packet in a multimedia system according to an embodiment of the present disclosure.

Referring to FIG. 3, an ALP packet includes a header 3100 and a payload 3200.

The header 3100 may include a base header 3110, an additional header 3120, and an optional header 3130. Whether the additional header 3120 is included in the header 3100 may vary according to a value of a control value included in the base header 3110.

Whether to include the optional header 3130 into the ALP packet header 3100 may be selected using a control field included in the additional header 3120.

A format of an ALP packet in a multimedia system according to an embodiment of the present disclosure has been described with reference to FIG. 3, and a format of a base header included in an ALP packet in a multimedia system according to an embodiment of the present disclosure will be described with reference to FIG. 4.

Figure 4:
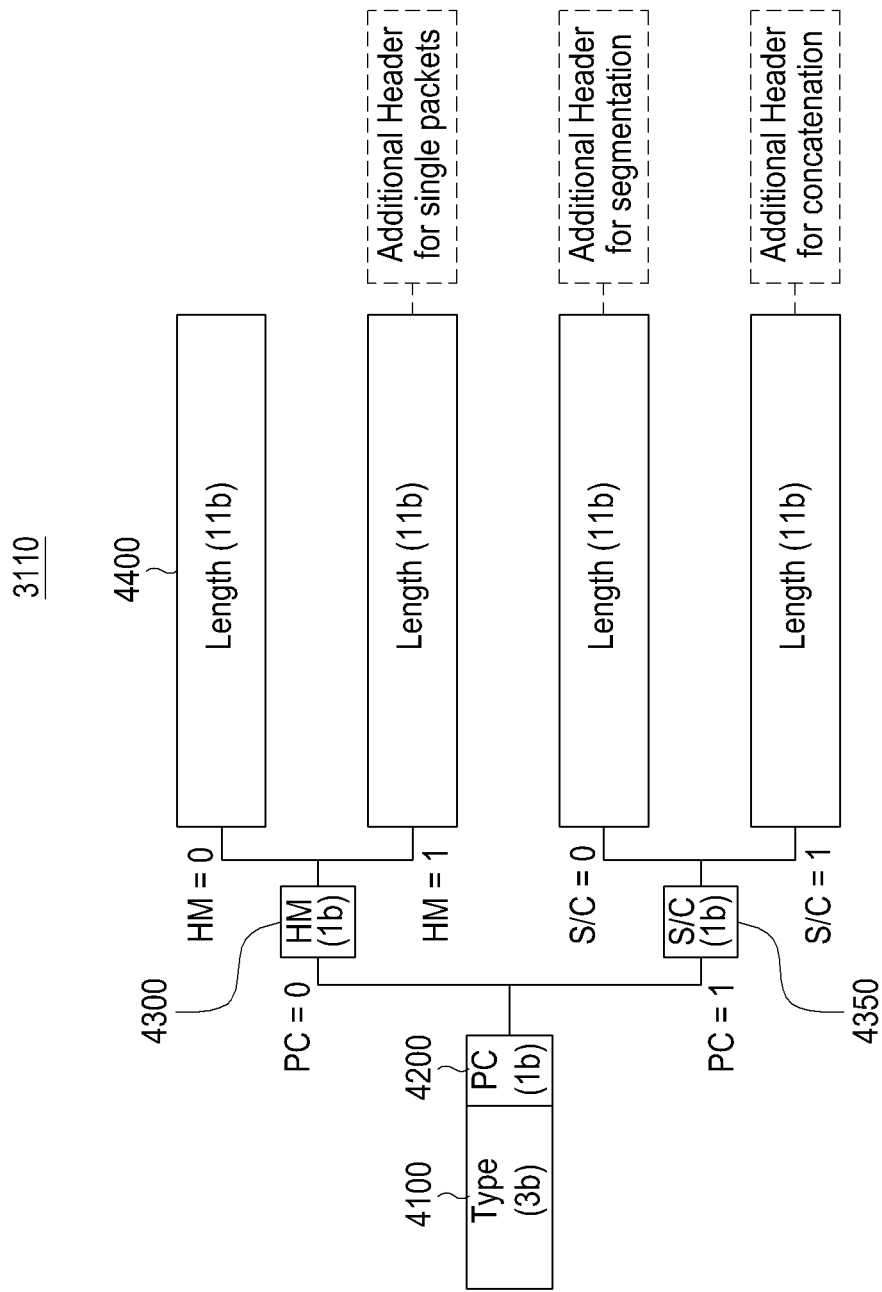
FIG. 4 schematically illustrates a format of a base header included in an ALP packet in a multimedia system according to an embodiment of the present disclosure.

FIG. 4 schematically illustrates a format of a base header included in an ALP packet in a multimedia system according to an embodiment of the present disclosure.

Referring to FIG. 4, a base header 3110 includes a packet type (Packet_Type) field 4100. At this time, configuration for other fields may vary according to a value of the Packet_Type field 4100, and it will be noted that configuration of fields included in the base header 3110 is configuration of fields used in a case that an input packet is at least one of an IP version 4 (IPv4) packet, a compressed IP packet, a link layer signaling packet, and an extension packet.

The base header 3110 further includes a payload_configuration (PC) field 4200. A 1-bit field may be present after the PC field 4200, and meaning of the 1-bit field may vary according to a value of the PC field 4200.

For example, if the value of the PC field 4200 is 0, the 1-bit field which is present after the PC field 4200 may be a header mode (HM) field 4300, and the HM field 4300 indicates whether an additional header 3120 is present at an ALP packet header 3100. For another example, if the value of the PC field 4200 is 1, the 1-bit field which is present after the PC field 4200 may be a segmentation/concatenation (S/C) field 4350, and the S/C field 4350 indicates whether the payload 3200 includes a plurality of input packets or a part of an input packet. Configuration of an additional header 3120 may vary according to a value of the S/C field 4350.

The base header 3110 includes a length field 4400 indicating least significant bit (LSB) 11 bits of a length of the payload 3200.

Meanwhile, a base header illustrated in FIG. 4 may be expressed as Table 1.

TABLE 1

| Syntax | Number of bits | Mnemonic |
|---|---|---|
| ALP_Packet_Header( ) { | | |
|   Packet_Type | 3 | uimsbf |
|   Payload_Configuration | 1 | bslbf |
|   if (Payload_Configuration =="0"){ | | |
|     Header_Mode | 1 | bslbf |
|     Length | 11 | uimsbf |
|     if (Header_Mode =="1"){ | | |
|       Additional_Header_for_Single_Packet( ) | var | |
|     } | | |
|   } | | |
|   else if (Payload_Config =="1"){ | | |
|     Segmentation_Concatenation | 1 | bslbf |

TABLE 1-continued

| Syntax | Number of bits | Mnemonic |
|---|---|---|
|     Length | 11 | uimsbf |
|     if (Segmentation_Concatenation =="0"){ | | |
|         Additional_Header_for_Segmentation( ) | var | |
|     } | | |
|     else if (Segmentation_Concatenation =="1"){ | | |
|         Additional_Header_for_Concatenation( ) | var | |
|     } | | |
|   } | | |
| } | | |

In Table 1, a Packet_Type field indicates a protocol which is applied to an input packet before being encapsulated into an ALP packet, or a packet type. For example, the Packet_Type field may be implemented with a 3-bit field.

A value of the Packet_Type field may have meaning as shown in Table 2.

TABLE 2

| Packet_TypeValue | Meaning |
|---|---|
| 000 | IPv4 packet |
| 001 | Compressed IP packet |
| 010 | MPEG-2 Transport Stream |
| 011 | Reserved |
| 100 | Link layer signaling packet |
| 101 | Reserved |
| 110 | Reserved |
| 111 | Packet Type Extension |

For example, in Table 2, if a value of the Packet_Type field is '000', it means that a packet type is an IPv4 packet, if a value of the Packet_Type field is '001', it means that a packet type is a compressed IP packet, if a value of the Packet_Type field is '010', it means that a packet type is an MPEG-2 transport stream, if a value of the Packet_Type field is '011', it means that the Packet_Type field is reserved for future use, if a value of the Packet_Type field is '100', it means that an input packet is a link layer signaling packet, if a value of the Packet_Type field is '101' or '110', it means that the Packet_Type field is reserved for future use, and if a value of the Packet_Type field is '111', it means that an input packet is an packet type extension.

In Table 1, for example, a Payload_Configuration field may correspond to a PC field 4200, and indicates configuration of a payload, e.g., a payload 3200. For example, the Payload_Configuration field may be implemented with a 1-bit field. For example, if a value of the Payload_Configuration field, e.g., the PC field 4200 is 0, the payload 3200 includes only one whole input packet, and an HM field 4300 is present after the PC field 4200. For another example, if the value of the PC field 4200 is 1, the payload 3200 may include a plurality of whole input packets or a part of one input packet, and an S/C field 4350 is present after the PC field 4200.

In Table 1, a Header_Mode field indicates whether an additional header is present. For example, the Header_Mode field may be implemented with a 1-bit field. If a value of the Header_Mode field, e.g., an HM field 4300 is 0, it means that there is no additional header, and it means that a length of a payload 3200 is less than a preset length, e.g., 2048 bytes. If a value of the HM field 4300 is 1, it means that an additional header is present after a Length field 4400, and the length of the payload 3200 is greater than 2047 bytes or an optional header 3130 including a sub-stream Identifier is present. The HM field 4300 may be present only if the value of the PC field 4200 is 0.

In Table 1, a Segmentation_Concatenation field indicates whether a payload, e.g., a payload 3200 includes a plurality of complete input packets or a part of an input packet. For example, the Segmentation_Concatenation field may be implemented with a 1-bit field. If a value of the Segmentation_Concatenation field, e.g., an S/C field 4350 is 0, the payload 3200 includes a part of one input packet, and includes an additional header field 3120 defined for packet segment after a Length field 4400. If the value of the S/C field 4350 is 1, the payload 3200 includes a plurality of complete input packets, and includes an additional header 3120 defined for packet concatenation after the Length field 4400. The S/C field 4350 may be present only if the value of the PC field 4200 is 1.

In Table 1, a Length field indicates a length of a payload field, e.g., a payload 3200. For example, the Length field indicates LSB 11 bits of a length in bytes of the payload 3200. If the additional header 3120 includes most significant bit (MSB) bits of the length in bytes of the payload 3200, the LBS 11 bits are combined with the MSB bits thereby indicating a total length of the payload 3200.

A format of a base header included in an ALP packet in a multimedia system according to an embodiment of the present disclosure has been described with reference to FIG. 4, and a format of an additional header in a case that a payload includes a single input packet in a multimedia system according to an embodiment of the present disclosure will be described with reference to FIG. 5.

Figure 5:
FIG. 5 schematically illustrates a format of an additional header in a case that a payload includes a single input packet in a multimedia system according to an embodiment of the present disclosure.

FIG. 5 schematically illustrates a format of an additional header in a case that a payload includes a single input packet in a multimedia system according to an embodiment of the present disclosure.

Referring to FIG. 5, it will be noted that a format of an additional header 5000 illustrated in FIG. 5 is a format of an additional header in a case that a payload, e.g., a payload 3200 includes a single input packet.

The additional header 5000 includes a Length_MSB field 5100 indicating MSB 5 bits in a case that a length in bytes of the payload 3200 is expressed with 16 bits, a reserved field 5200, a sub-stream identifier flag (SIF) field 5300 indicating whether a sub-stream identifier is present, and a header extension flag (HEF) field 5400 indicating whether a header extension is present. For example, the field 5200 may be implemented with a 1-bit field.

According to an embodiment of the present disclosure in FIG. 4, the additional header 5000 in FIG. 5 may be present only if the payload 3200 included in an ALP packet includes one complete packet, and a length of the one complete packet is greater than a preset length, e.g., 2047 bytes or an optional header is present. That is, the additional header 5000 may be present only if a value of a PC field 4200 is 0 and a value of an HM field 4300 is 1.

Meanwhile, the additional header 5000 in FIG. 5 may be expressed as Table 3.

TABLE 3

| Syntax | Number of bits | Mnemonic |
|---|---|---|
| Additional_Header_for_Long_Packet ( ) { | | |
|    Length_MSB | 5 | uimsbf |
|    reserved | 1 | bslbf |
|    SIF | 1 | bslbf |
|    HEF | 1 | bslbf |
|    if (SIF =="1"){ | | |
|       SID | 8 | bslbf |
|    } | | |
|    if (HEF =="1"){ | | |
|       Header_Extension( ) | var | |
|    } | | |
| } | | |

In Table 3, a Length_MSB field indicates MSB 5 bits of a length in bytes of the payload 3200 if a length in bytes of a payload, e.g., the payload 3200 is expressed with 16 bits. The MSB 5 bits are combined with LSB 11 bits indicated by a Length field 4400 included in a base header 3110 thereby indicating a total length of the payload 3200.

In Table 3, an SIF field indicates whether a sub-stream identifier (SID) is present after an HEF field 5400. For example, the SIF field may be implemented with a 1-bit field. For example, if a value of the SIF field, e.g., an SIF field 5300 is 0, there is no SID field. If the value of the SIF field 5300 is 1, the SID field is present after the HEF field 5400.

In Table 3, an HEF field indicates whether a header extension is present after the additional header 5000. For example, the HEF field may be implemented with a 1-bit field. For example, if a value of an HEF field 5400 is 0, there is no header extension. If the value of the HEF field 5400 is 1, the header extension is present after the additional header 5000. In a case that the header extension is present, the header extension is present after the SID field if the SID field is present, and the header extension is present after the HEF field 5400 if there is no SID field.

In Table 3, an SID field indicates an SID for an ALP packet. Here, an SID may be a service identifier for each of a plurality of services at an ALP stream which carriers the plurality of services.

A format of an additional header in a case that a payload includes a single input packet in a multimedia system according to an embodiment of the present disclosure has been described with reference to FIG. 5, and a format of an additional header in a case that a payload includes a part of a single input packet in a multimedia system according to an embodiment of the present disclosure will be described with reference to FIG. 6.

Figure 6:
FIG. 6 schematically illustrates a format of an additional header in a case that a payload includes a part of a single input packet in a multimedia system according to an embodiment of the present disclosure.

FIG. 6 schematically illustrates a format of an additional header in a case that a payload includes a part of a single input packet in a multimedia system according to an embodiment of the present disclosure.

Referring to FIG. 6, it will be noted that a format of an additional header illustrated in FIG. 6 is a format of an additional header in a case that a payload includes a part of a single input packet.

Referring to FIG. 6, if a payload, e.g., a payload 3200 includes a part of a single input packet, additional header, e.g., an additional header 6000 includes a segment_sequence_number field 6100 indicating an identifier of a segmented input packet, a last_segment_indicator (LSI) field 6200 indicating whether the payload 3200 includes the last segment of an input packet, an SIF field 6300 indicating whether an SID is present, and an HEF field 6400 indicating whether a header extension is present.

According to an embodiment of the present disclosure in FIG. 4, the additional header 6000 in FIG. 6 may be present only if a payload 3200, e.g., a payload 3200 included in an ALP packet includes a part of a single input packet. That is, the additional header 6000 may be present only if a value of a PC field, e.g., a PC field 4200 is 1 and a value of an S/C field, e.g., an S/C field 4350 is 0.

Meanwhile, the additional header 6000 in FIG. 6 may be expressed as Table 4.

TABLE 4

| Syntax | Number of bits | Mnemonic |
|---|---|---|
| Additional_Header_for_Segmentation ( ) { | | |
|    Segment_Sequence_Number | 5 | |
|    Last_Segment_Indicator | 1 | |
|    SIF | 1 | bslbf |
|    HEF | 1 | bslbf |
|    if (SIF =="1"){ | | |
|       SID | 8 | bslbf |
|    } | | |
|    if (HEF =="1"){ | | |
|       Header_Extension( ) | var | |
|    } | | |
| } | | |

In Table 4, a segment_sequence_number field indicates a number for identifying a part, i.e., a segment of an input packet included in a payload, e.g., a payload 3200, and may be an integer which is equal to or greater than 0 For example, in a case that the input packet is segmented into a plurality of segments, if the first segment among the plurality of segments is included in the payload 3200, a value of the segment_sequence_number field 6100 is set to 0. Whenever the next segment of the input packet is transported through an ALP packet, the value of the segment_sequence_number field 6100 is incremented by a preset value, e.g., 1.

In Table 4, a last_segment_indicator field indicates whether a payload, e.g., a payload 3200 includes the last segment (or the last byte) of the input packet, and may be implemented with a 1-bit field. If the payload 3200 includes the last segment (or the last byte) of the input packet, a value of the last_segment_indicator field, e.g., an LSI field 6200 is set to 1. If the payload 3200 does not include the last segment (or the last byte) of the input packet, the value of the LSI field 6200 is set to 0.

In Table 4, an SIF field indicates whether an SID field is present after an HEF field, e.g., an HEF field 6400. The SIF field may be implemented with a 1-bit field. If a value of the SIF field, e.g., an SIF field 6300 is 0, there is no SID field. If the value of the SIF field 6300 is 1, the SID field is present after the HEF field 6400.

In Table 4, an HEF field indicates whether a header extension is present after an additional header, e.g., an additional header 6000. For example, the HEF field may be implemented with a 1-bit field. For example, if a value of an HEF field 6400 is 0, there is no header extension. If the value of the HEF field 6400 is 1, the header extension is present after the additional header 6000. In a case that the header extension is present, the header extension is present after the SID field if the SID field is present, and the header extension is present after the HEF field 6400 if there is no SID field.

A format of an additional header in a case that a payload includes a part of a single input packet in a multimedia system according to an embodiment of the present disclosure has been described with reference to FIG. 6, and a format of an additional header in a case that a payload includes a plurality of input packets in a multimedia system according to an embodiment of the present disclosure will be described with reference to FIG. 7.

Figure 7:
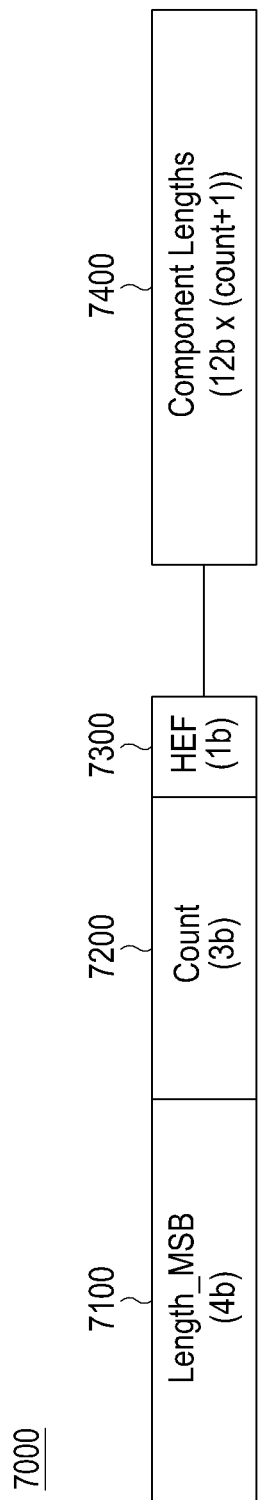
FIG. 7 schematically illustrates a format of an additional header in a case that a payload includes a plurality of input packets in a multimedia system according to an embodiment of the present disclosure.

FIG. 7 schematically illustrates a format of an additional header in a case that a payload includes a plurality of input packets in a multimedia system according to an embodiment of the present disclosure.

Referring to FIG. 7, it will be noted that a format of an additional header in FIG. 7 is a format of an additional header in a case that a payload includes a plurality of input packets.

If a payload, e.g., a payload 3200 includes a plurality of input packets, an additional header 7000 includes a Length_MSB field 7100 indicating MSB 4 bits of a length in bytes of the payload 3200 in a case that the length in bytes of the payload 3200 is expressed with 15 bits, a Count field 7200 indicating the number of input packets included in the payload 3200, an HEF field 7300 indicating whether a header extension is present, and a Component Length field 7400 indicating a length of each input packet.

Meanwhile, the additional header 7000 in FIG. 7 may be expressed as Table 5.

TABLE 5

| Syntax | Number of bits | Mnemonic |
|---|---|---|
| Additional_Header_for_Concatenation ( ) { | | |
|    Length_MSB | 4 | uimsbf |
|    Count | 3 | uimsbf |
|    HEF | 1 | bslbf |
|    for(i=0; i<Count−1; i++) { | | |
|       Component_Length | 12 | uimsbf |
|    } | | |
|    if (HEF =="1"){ | | |
|       Header_Extension( ) | var | |
|    } | | |
| } | | |

In Table 5, a Length_MSB indicates LSB 4 bits of a length in bytes of a payload, e.g., a payload 3200 in a case that the length in bytes of the payload 3200 is expressed 15 bits. The LSB 4 bits are combined with LSB 11 bits indicated by a Length field 4400 included in a base header, e.g., a base header 3110 thereby indicating a total length in bytes of the payload 3200.

In Table 5, a Count field indicates the number of input packets included in the payload 3200. For example, the Count field may be implemented with a 3-bit field. A value of the Count field, e.g., a Count field 7200 is set to the number of the input packets included in the payload 3200.

In Table 5, an HEF field indicates whether a header extension is present after an additional header, e.g., an additional header 7000. For example, the HEF field may be implemented with a 1-bit field. If a value of an HEF field, e.g., an HEF field 7300 is 0, there is no header extension. If the value of the HEF field 7300 is 1, a header extension is present after the additional header 7000. In a case that there is the header extension, if an SID field is present, the header extension is present after the SID field, and if there is no SID field, the extension header is present after the HEF field 7300.

In Table 5, a Component Length field indicates lengths of input packets included in a payload, e.g., a payload 3200. The lengths of the input packets are included in the same order as the input packets included in the payload 3200 and a length of the last input packet is not included.

A format of an additional header in a case that a payload includes a plurality of input packets in a multimedia system according to an embodiment of the present disclosure has been described with reference to FIG. 7, and a format of an optional header included in an ALP packet in a multimedia system according to an embodiment of the present disclosure will be described with reference to FIG. 8.

Figure 8:
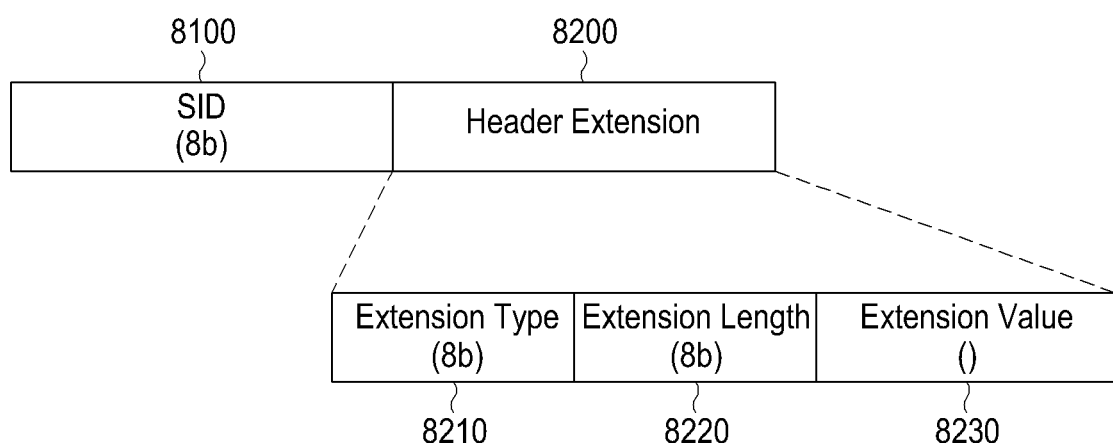
FIG. 8 schematically illustrates a format of an optional header included in an ALP packet in a multimedia system according to an embodiment of the present disclosure.

FIG. 8 schematically illustrates a format of an optional header included in an ALP packet in a multimedia system according to an embodiment of the present disclosure.

Referring to FIG. 8, an optional header, e.g., an optional header 3130 may include an SID field 8100 indicating an SID and a header extension field 8200.

The header extension field 8200 includes an extension type field 8210 indicating a type of a header extension, an extension length field 8220 indicating a length of a header extension, and an extension value field 8230 including contents of extension fields.

A length of the extension value 8230 is given by the extension length field 8220. A receiving apparatus checks a value of the extension type field 8210, calculates a total length of the header extension field 8200 based on the value of the extension type field 8210 if the value of the extension type field 8210 is a value that the receiving apparatus may not analyze, and removes bytes which correspond to the calculated length.

A value of the SID field 8100 is set to a unique value which may be identified within one radio frequency (RF) signal, and a broadcast link layer, e.g., a broadcast link layer 1400 may perform link layer filtering based on the value of the SID field 8100.

For example, it will be assumed that five services are transported through an RF signal which has one signal processing path, e.g., one PLP, and each of the five services are transported using three UDP/IP ports. A receiving apparatus recovers link layer packets by processing a signal received through the PLP corresponding to a preset processing scheme. The receiving apparatus recovers packets which correspond to fifteen UDP/IP sessions and outputs the recovered packets to an upper layer.

A service selected by a terminal uses three UDP/IP sessions, so packets transported through the fifteen UDP/IP sessions are filtered at an IP layer, e.g., an IP layer 1300 or a UDP layer, e.g., a UDP layer 1200 according to an address thereof. This means that most of packets output from a link layer, e.g., about 80% of packets output from the link layer are unnecessary data at an upper layer, and this decreases system efficiency.

If the broadcast physical layer 1500, the broadcast link layer 1400, and the IP layer 1300 are implemented with separate hardware, or if the broadcast physical layer 1500, the broadcast link layer 1400, and the IP layer 1300 share an interface with other shared layer, system efficiency may be significantly decrease due to unnecessary data transmission.

So, an embodiment of the present disclosure allocates a separate SID to each service, allocates an SID to a link layer packet carrying a service, processes only a link layer packet with an SID which corresponds to a service when the service is selected, and outputs only the processed packets to an IP layer thereby increasing system efficiency.

In an embodiment of the present disclosure, one-to-one mapping between a service and an SID is described, however, an SID may be freely allocated according to a grouping format of input packets to be grouped within one link layer stream. Here, the grouping format may be an IP address, a UDP port number, a session identifier of an application layer protocol, or a combination of the IP address, the UDP port number, the session identifier of the application layer protocol. The session identifier of the application layer protocol may be a packet_id in an MMTP, or a Transmitting Subscriber Identification (TSI) in a ROUTE protocol.

Further, one ALP packet stream may include ALP packets to which an SID is allocated and ALP packets to which an SID is not allocated. In this case, it may be preferred to process the ALP packets to which the SID is not allocated to output the processed packets to an upper layer, and perform a filtering operation based on the ALP packets to which the SID is allocated.

Meanwhile, an embodiment of the present disclosure may use a link layer for informing a receiving apparatus of relation between an SID and an upper layer input packet stream.

Table 6 shows an example of a link mapping table for informing mapping relation between an SID and a UDP/IP session.

TABLE 6

| Syntax | Number of bits | Mnemonic |
|---|---|---|
| SID_Signaling ( ) { | | |
|    Table_id | 8 | uimsbf |
|    Table_id_extension | 8 | uimsbf |
|    Version | 8 | uimsbf |
|    Num_session | 8 | bslbf |
|    for(i=0; i<Num_ session −1: i++) { | | |
|       Src_IP_add | 32 | uimsbf |
|       Dst_IP_add | 32 | uimsbf |
|       Src_UDP_port | 16 | uimsbf |
|       Dst_UDP_port | 16 | uimsbf |
|       SID_flag | 1 | bslbf |
|       reserved | 7 | '1111111' |
|       if (SID_flag =="1"){ | | |
|          SID | 8 | uimsbf |
|       } | | |
|    } | | |
| } | | |

In Table 6, a Table_id field indicates an ID of a link mapping table which transmits an SID_signaling. For example, the Table_id field may be implemented with an 8-bit field.

In Table 6, a Table_id_extension field indicates an identifier extension of a link mapping table. For example, the Table_id_extension field may be implemented with an 8-bit field.

In Table 6, a Version field indicates a version of the link mapping table. For example, the Version field may be implemented with an 8-bit field. For example, a value of the Version field is incremented when a value of the link mapping table is changed.

In Table 6, a Num_session field indicates the number of sessions that information is described at the link mapping table. For example, the Num_session field may be implemented with an 8-bit field.

In Table 6, a Src_IP_add field indicates a source IP address. For example, the Src_IP_add field may be implemented with a 32-bit field. In Table 6, a Dst_IP_add field indicates a destination IP address. The Dst_IP_add field may be implemented with a 32-bit field.

In Table 6, a Src_UDP_port field indicates a source UDP port number. The Src_UDP_port field may be implemented with a 16-bit field.

In Table 6, a Dst_UDP_port field indicates a destination UDP port number. The Dst_UDP_port field may be implemented with a 16-bit field.

In Table 6, an SID_flag field indicates whether an SID is allocated. For example, the SID_flag field may be implemented with a 1-bit field. For example, only if a value of the SID_flag field is 1, an SID is allocated to an ALP packet including a UDP/IP packet which is transported through a session.

In Table 6, an SID field indicates an SID. For example, the SID field may be implemented with an 8-bit field. The SID may be a value which is unique within an RF signal, e.g., a physical layer frame.

Table 7 shows another example of a link mapping table for informing mapping relation between an SID and a UDP/IP session.

TABLE 7

| Syntax | Number of bits | Mnemonic |
|---|---|---|
| SID_Signaling ( ) { | | |
|    Table_id | 8 | uimsbf |
|    Table_id_extension | 8 | uimsbf |
|    Version | 8 | uimsbf |
|    Num_service | 8 | bslbf |
|    for(i=0; i<Num_service−1; i++) { | | |
|       service_id | 16 | uimsbf |
|       Num_session | 8 | uimsbf |
|       for(i=0; i<Num_session−1; i++) { | | |
|          Src_IP_add | 32 | uimsbf |
|          Dst_IP_add | 32 | uimsbf |
|          Src_UDP_port | 16 | uimsbf |
|          Dst_UDP_port | 16 | uimsbf |
|       } | | |
|       SID_flag | 1 | bslbf |
|       reserved | 7 | '1111111' |
|       if (SID_flag =="1"){ | | |
|          SID | 8 | uimsbf |
|       } | | |
|    } | | |
| } | | |

In Table 7, a Num_service field indicates the number of services of which information is described at the link mapping table. For example, the Num_service field may be implemented with an 8-bit field.

In Table 7, a Service id field indicates a service identifier. For example, the Service_id field may be implemented with a 16-bit field.

Remaining fields included in Table 7, i.e., a Table_id field, a Table_id_extension field, a Version field, a Num_session field, a Src_IP_add field, a Dst_IP_add field, a Src_UDP_port field, a Dst_UDP_port field, an SID_flag field, and an SID field have been described with reference to Table 6, and a detailed description thereof will be omitted herein. A link mapping table shown in Table 6 denotes a link mapping table in a case that an SID is allocated to each UDP/IP session. A link mapping table shown in Table 7 denotes a link mapping table in a case that an SID is allocated on a service basis.

If IP header compression is applied according to an embodiment of the present disclosure, signaling information required for the IP header compression may be included in the link mapping table shown in Table 6 or the link mapping table shown in Table 7.

For example, an identifier indicating an IP header compression scheme used in a case that one or more IP header compression schemes are used and information required for a receiving apparatus to recover a compression header may be included in the link mapping table shown in Table 6 or the link mapping table shown in Table 7. An example of the information required for recovering the compression header may be a context ID of robust header compression (ROHC).

Meanwhile, an example of a method for transmitting relation between an SID and a service to a receiving apparatus according to an embodiment of the present disclosure is to use an SLT 1150.

Table 8 shows a descriptor indicating mapping relation between an SID and a service, i.e., a link_layer_filtering_descriptor. For example, the descriptor may be transmitted as a service-level descriptor within a service loop of an SLT.

TABLE 8

| Syntax | No. of Bits | Format |
|---|---|---|
| link_layer_filtering_descriptor( ) { | | |
| descriptor_tag | 8 | uimsbf |
| descriptor_length | 8 | uimsbf |
| SID | 8 | uimsbf |
| } | | |

In Table 8, an SID field indicates an SID which corresponds to a service at which the descriptor is located. For example, the SID field may be implemented with an 8-bit field.

A transmitting apparatus according to an embodiment of the present disclosure may set the same value as an SID shown in Table 8 in an SID field, e.g., an SID field 8100 of an optional field included in a link layer packet transporting a service to which the SID is allocated.

As described above, according to various embodiments of the present disclosure, data processing efficiency may be increased by filtering a packet in a link layer.

A format of an optional header included in an ALP packet in a multimedia system according to an embodiment of the present disclosure has been described with reference to FIG. 8, and an inner structure of a transmitting apparatus in a multimedia system according to an embodiment of the present disclosure will be described with reference to FIG. 9.

Figure 9:
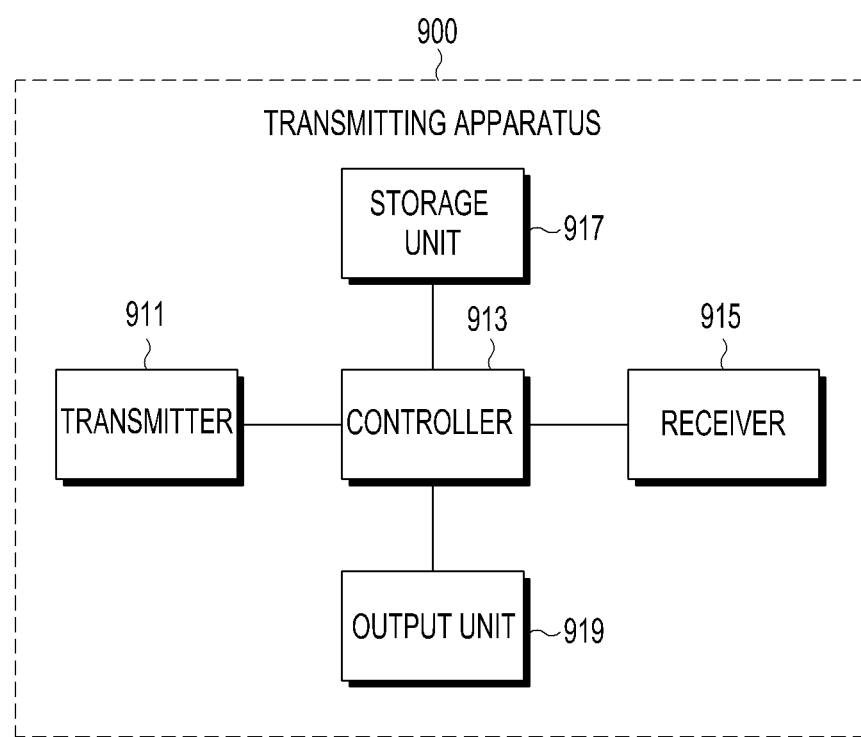
FIG. 9 schematically illustrates an inner structure of a transmitting apparatus in a multimedia system according to an embodiment of the present disclosure.

FIG. 9 schematically illustrates an inner structure of a transmitting apparatus in a multimedia system according to an embodiment of the present disclosure.

Referring to FIG. 9, a transmitting apparatus 900 may be a service provider, and/or the like.

The transmitting apparatus 900 includes a transmitter 911, a controller 913, a receiver 915, a storage unit 917, and an output unit 919.

The controller 913 controls the overall operation of the transmitting apparatus 900. More particularly, the controller 913 controls an operation related to an operation of transmitting and receiving a signal in a multimedia system according to an embodiment of the present disclosure, e.g., an operation of transmitting and receiving information related to a link layer packet carrying a plurality of sub-streams. The operation related to the operation of transmitting and receiving the information related to the link layer packet carrying the plurality of sub-streams has been described with reference to FIGS. 1 to 8 and Tables 1 to 8, and a detailed description thereof will be omitted herein.

The transmitter 911 transmits various signals and various messages to other entities, e.g., a receiving apparatus and the like included in the multimedia system under a control of the controller 913. For example, the receiving apparatus may be a terminal and/or the like. The various signals and various messages transmitted in the transmitter 911 have been described with reference to FIGS. 1 to 8 and Tables 1 to 8, and a detailed description thereof will be omitted herein.

The receiver 915 receives various signals and various messages from other entities, e.g., a receiving apparatus and the like included in the multimedia system under a control of the controller 913. The various signals and various messages received in the receiver 915 have been described with reference to FIGS. 1 to 8 and Tables 1 to 8, and a detailed description thereof will be omitted herein.

The storage unit 917 stores various programs, various data, and the like related to the operation related to the operation of transmitting and receiving the information related to the link layer packet carrying the plurality of sub-streams performed in the multimedia system according to an embodiment of the present disclosure under a control of the controller 913. The storage unit 917 stores various signals and various messages which are received by the receiver 915 from the other entities.

The output unit 919 outputs various signals and various messages related to the operation related to the operation of transmitting and receiving the information related to the link layer packet carrying the plurality of sub-streams performed in the multimedia system according to an embodiment of the present disclosure under a control of the controller 913. The various signals and various messages output by the output unit 919 have been described with reference to FIGS. 1 to 8 and Tables 1 to 8, and a detailed description thereof will be omitted herein.

While the transmitter 911, the controller 913, the receiver 915, the storage unit 917, and the output unit 919 are described in the transmitting apparatus 900 as separate units, it is to be understood that this is merely for convenience of description. In other words, two or more of the transmitter 911, the controller 913, the receiver 915, the storage unit 917, and the output unit 919 may be incorporated into a single unit.

The transmitting apparatus 900 may be implemented with one processor.

An inner structure of a transmitting apparatus in a multimedia system according to an embodiment of the present disclosure has been described with reference to FIG. 9, and an inner structure of a receiving apparatus in a multimedia system according to an embodiment of the present disclosure will be described with reference to FIG. 10.

Figure 10:
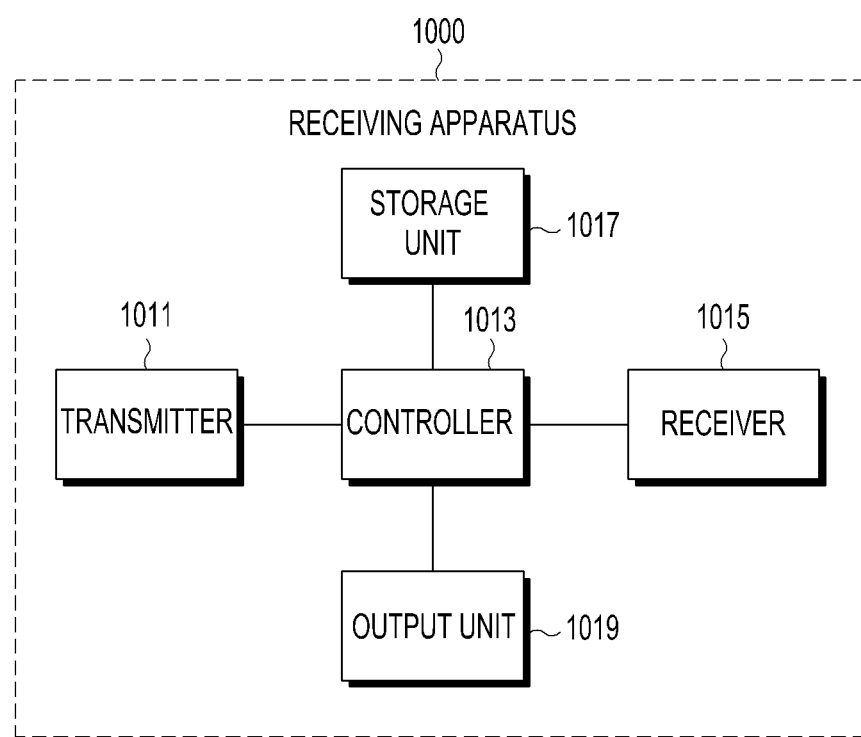
FIG. 10 schematically illustrates an inner structure of a receiving apparatus in a multimedia system according to an embodiment of the present disclosure.

FIG. 10 schematically illustrates an inner structure of a receiving apparatus in a multimedia system according to an embodiment of the present disclosure.

Referring to FIG. 10, a receiving apparatus 1000 may be a terminal, and/or the like.

The receiving apparatus 1000 includes a transmitter 1011, a controller 1013, a receiver 1015, a storage unit 1017, and an output unit 1019.

The controller 1013 controls the overall operation of the receiving apparatus 1000. More particularly, the controller 1013 controls an operation related to an operation of transmitting and receiving a signal in a multimedia system according to an embodiment of the present disclosure, e.g., an operation of transmitting and receiving information related to a link layer packet carrying a plurality of sub-streams. The operation related to the operation of transmitting and receiving the information related to the link layer packet carrying the plurality of sub-streams has been described with reference to FIGS. 1 to 8 and Tables 1 to 8, and a detailed description thereof will be omitted herein.

The transmitter 1011 transmits various signals and various messages to other entities, e.g., a transmitting apparatus and the like included in the multimedia system under a control of the controller 1013. For example, the transmitting apparatus may be a service provider and/or the like. The various signals and various messages transmitted in the transmitter 1011 have been described with reference to FIGS. 1 to 8 and Tables 1 to 8, and a detailed description thereof will be omitted herein.

The receiver 1015 receives various signals and various messages from other entities, e.g., a transmitting apparatus and the like included in the multimedia system under a control of the controller 1013. The various signals and various messages received in the receiver 1015 have been described with reference to FIGS. 1 to 8 and Tables 1 to 8, and a detailed description thereof will be omitted herein.

The storage unit 1017 stores various programs, various data, and the like related to the operation related to the operation of transmitting and receiving the information related to the link layer packet carrying the plurality of sub-streams performed in the multimedia system according to an embodiment of the present disclosure under a control of the controller 1013. The storage unit 1017 stores various signals and various messages which are received by the receiver 1015 from the other entities.

The output unit 1019 outputs various signals and various messages related to the operation related to the operation of transmitting and receiving the information related to the link layer packet carrying the plurality of sub-streams performed in the multimedia system according to an embodiment of the present disclosure under a control of the controller 1013. The various signals and various messages output by the output unit 1019 have been described with reference to FIGS. 1 through 8 and Tables 1 through 8, and a detailed description thereof will be omitted herein.

While the transmitter 1011, the controller 1013, the receiver 1015, the storage unit 1017, and the output unit 1019 are described in the receiving apparatus 1000 as separate units, it is to be understood that this is merely for convenience of description. In other words, two or more of the transmitter 1011, the controller 1013, the receiver 1015, the storage unit 1017, and the output unit 1019 may be incorporated into a single unit.

The receiving apparatus 1000 may be implemented with one processor.

As described above, a transmitting apparatus proposed in an embodiment of the present disclosure includes a link layer packet generator for generating a link layer packet including a header and a payload which correspond to an input stream, a frame generator for generating a physical layer frame including the link layer packet, a processor for processing the generated physical layer frame based on a preset scheme, and a transmitter for transmitting the processed physical layer frame. Here, the header includes a base header, an additional header, and an optional header. A format of the additional header and whether the additional header is present are determined based on a value of the base header, and the optional header may include a field indicating a sub-stream identifier. Whether the field indicating the sub-stream identifier is present may be determined based on a value of the additional header.

An operating method of a transmitting apparatus proposed in an embodiment of the present disclosure includes a process for generating a link layer packet including a header and a payload which correspond to an input stream, a process for generating a physical layer frame including the link layer packet, a process for processing the generated physical layer frame based on a preset scheme, and a process for transmitting the processed physical layer frame. Here, the header includes a base header, an additional header, and an optional header. A format of the additional header and whether the additional header is present are determined based on a value of the base header, and the optional header may include a field indicating a sub-stream identifier. Whether the field indicating the sub-stream identifier is present may be determined based on a value of the additional header.

A receiving apparatus proposed in an embodiment of the present disclosure includes a receiver for receiving a physical layer frame including data that an input stream is mapped to at least one signal processing path, and a processor for extracting a header from a link layer packet included in the physical layer frame and processing a payload based on the extracted header and a preset scheme. Here, the header includes a base header, an additional header, and an optional header. A format of the additional header and whether the additional header is present are determined according a value of the base header, and the optional header may include a field indicating a sub-stream identifier. Whether the field indicating the sub-stream identifier is present may be determined based on a value of the additional header.

An operating method of a receiving apparatus proposed in an embodiment of the present disclosure includes a process for receiving a physical layer frame including data that an input stream is mapped to at least one signal processing path, and a process for extracting a header from a link layer packet included in the physical layer frame and processing a payload based on the extracted header and a preset scheme. Here, the header includes a base header, an additional header, and an optional header. A format of the additional header and whether the additional header is present are determined according a value of the base header, and the optional header may include a field indicating a sub-stream identifier. Whether the field indicating the sub-stream identifier is present may be determined based on a value of the additional header.

As is apparent from the foregoing description, an embodiment of the present disclosure enables to transmit and receive a signal in a multimedia system.

An embodiment of the present disclosure enables to transmit and receive a signal in a multimedia system supporting a link layer protocol.

An embodiment of the present disclosure enables to transmit and receive information related to a sub-stream included in a link layer packet in a multimedia system supporting a link layer protocol.

An embodiment of the present disclosure enables to transmit and receive information related to a link layer packet carrying a plurality of sub-streams in a multimedia system supporting a link layer protocol.

An embodiment of the present disclosure enables to effectively transmit and receive various types of services in a multimedia system supporting a link layer protocol.

An embodiment of the present disclosure enables to filter a sub-stream in a link layer packet thereby increasing data processing efficiency in a multimedia system supporting a link layer protocol.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc ROMs (CD-ROMs), magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A transmitting apparatus in a broadcasting system, the transmitting apparatus comprising:
a transceiver; and
a controller coupled with the transceiver and configured to control to:
identify at least one network layer packet,
generate at least one link layer packet based on the at least one network layer packet, and
transmit the at least one link layer packet,
wherein a first link layer packet of the at least one link layer packet includes a header and a payload,
wherein the header comprises a base header including payload configuration information indicating a configuration of the payload,
wherein in case that the payload configuration information is set as a first value, the payload configuration information indicates that the payload carries a single network layer packet and header mode information is included in the base header, the header mode information indicating whether an additional header for the single network layer packet is included in the header,
wherein the header further comprises an extension header including sub-stream identification information, in case that flag information included in the additional header indicates that the sub-stream identification information is included in the extension header, and
wherein the sub-stream identification information is used to filter a packet stream in a link layer level, the packet stream being associated with one or more of the at least network layer packet.

2. The transmitting apparatus of claim 1, wherein in case that the payload configuration information is set as a second value, the payload configuration information indicates that the payload carries a plurality of network layer packets or a part of a network layer packet and segmentation/concatenation information is included in the base header.

3. The transmitting apparatus of claim 2,
wherein in case that the segmentation/concatenation information is set as a first value, the segmentation/concatenation information indicates that the payload carries the part of the network layer packet and an additional header for segmentation is included in the header, and
wherein in case that the segmentation/concatenation information is set as a second value, the segmentation/concatenation information indicates that the payload carries the plurality of the network layer packets and an additional header for concatenation is included in the header.

4. The transmitting apparatus of claim 1, wherein the controller is further configured to control to:
identify link layer signaling information; and
generate at least one first link layer packet based on the link layer signaling information,
wherein the link layer signaling information includes mapping information between one or more packet streams and one or more sub-stream identification information corresponding to the one or more packet streams.

5. The transmitting apparatus of claim 4,
wherein the mapping information includes source IP address information, destination IP address information, source UDP port information and destination UDP port information, and sub-stream flag information for each packet stream, and wherein a presence of sub-stream indication information for the each packet stream is determined based on the sub-stream flag information for the each packet stream.

6. A receiving apparatus in a broadcasting system, the receiving apparatus comprising:
a transceiver; and
a controller coupled with the transceiver and configured to control to:
receive at least one link layer packet, the at least one link layer packet being generated by a transmitting apparatus based on at least one network layer packet, and
process the received at least one link layer packet,
wherein a first link layer packet of the at least one link layer packet includes a header and a payload,
wherein the header comprises a base header including payload configuration information indicating a configuration of the payload,
wherein in case that the payload configuration information is set as a first value, the payload configuration information indicates that the payload carries a single network layer packet and header mode information is included in the base header, the header mode information indicating whether an additional header for the single network layer packet is included in the header,
wherein the header further comprises an extension header including sub-stream identification information, in case that flag information included in the additional header indicates that the sub-stream identification information is included in the extension header, and
wherein the sub-stream identification information is used to filter a packet stream in a link layer level, the packet stream being associated with one or more of the at least network layer packet.

7. The receiving apparatus of claim 6, wherein in case that the payload configuration information is set as a second value, the payload configuration information indicates that the payload carries a plurality of network layer packets or a part of a network layer packet and segmentation/concatenation information is included in the base header.

8. The receiving apparatus of claim 7,
wherein in case that the segmentation/concatenation information is set as a first value, the segmentation/concatenation information indicates that the payload carries the part of the network layer packet and an additional header for segmentation is included in the header, and
wherein in case that the segmentation/concatenation information is set as a second value, the segmentation/concatenation information indicates that the payload carries the plurality of the network layer packets and an additional header for concatenation is included in the header.

9. The receiving apparatus of claim 6, wherein the controller is further configured to control to:
receive a second link layer packet generated by the transmitting apparatus based on link layer signaling information, and
wherein the link layer signaling information includes mapping information between one or more packet streams and one or more sub-stream identification information corresponding to the one or more packet streams.

10. The receiving apparatus of claim 9,
wherein the mapping information includes source IP address information, destination IP address information, source UDP port information and destination UDP port information, and sub-stream flag information for each packet stream, and
wherein a presence of sub-stream indication information for the each packet stream is determined based on the sub-stream flag information for the each packet stream.

* * * * *